March 23, 1926. 1,577,947
R. H. BURKEY
DEVICE FOR OPERATING THE PLANT HOEING MEMBERS OF CULTIVATORS
Filed Oct. 3, 1924 2 Sheets-Sheet 1

Inventor
Roy H. Burkey
By
Attorney

March 23, 1926.
R. H. BURKEY
1,577,947
DEVICE FOR OPERATING THE PLANT HOEING MEMBERS OF CULTIVATORS
Filed Oct. 3, 1924     2 Sheets-Sheet 2
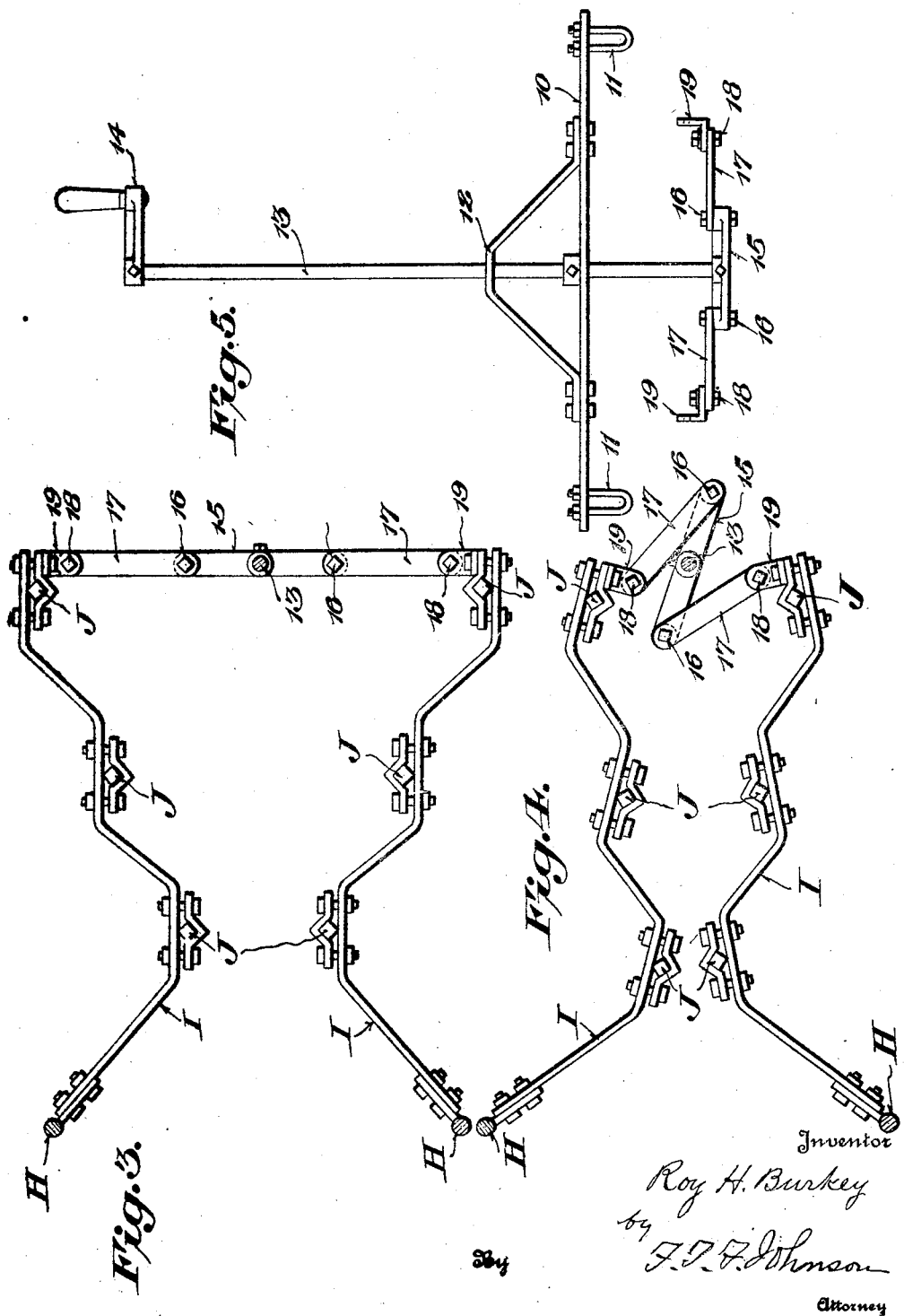

Patented Mar. 23, 1926.

1,577,947

UNITED STATES PATENT OFFICE.

ROY H. BURKEY, OF GAP, PENNSYLVANIA.

DEVICE FOR OPERATING THE PLANT-HOEING MEMBERS OF CULTIVATORS.

Application filed October 3, 1924. Serial No. 741,359.

*To all whom it may concern:*

Be it known that I, ROY H. BURKEY, a citizen of the United States, residing at Gap, in the county of Lancaster and State of Pennsylvania, have invented certain new and useful Improvements in Devices for Operating the Plant-Hoeing Members of Cultivators, of which the following is a specification.

This invention relates to cultivators, particularly to attachments thereto or accessories for use in connection therewith, and has for its primary object the provision of novel means associated with an ordinary straddle row cultivator for the purpose of effecting cultivation of the soil between the successive plants in a row.

It is well known that cultivators of a prominent make, and perhaps many others, have been equipped with so-called tobacco hoeing attachments or auxiliary devices for breaking up the soil between the plants in a row. This means ordinarily consists of a pair of beams or bars pivotally supported at their forward ends on the beams which carry the gangs of shovels or other implements, these beams or bars being equipped with tooth-like elements so arranged as to be moved through the soil into close proximity to the successive plants when the auxiliary beams or bars are moved by lever devices. With cultivators equipped with this attachment or auxiliary inter-plant cultivating means, it is necessary to employ the services of two operators, one to drive, steer and otherwise control the action of the cultivator, and the other to operate manual lever devices which control the auxiliary or inter-plant cultivating attachment.

A more specific object of the present invention is to provide an attachment in the nature of means mounted upon a cultivator and operatively connected with the auxiliary beams or bars provided for inter-row cultivation whereby the driver himself may effect the bringing together and subsequent separation of these elements in addition to performing his other duties as to steering, etc., thereby entirely eliminating any necessity for a second operator and consequently reducing the cost of labor.

Still more specifically stated, the object of the invention is to provide a manually operable control device adapted to be clamped upon a cultivator equipped with the auxiliary mechanism for cultivating between the plants of a row, the device being so constructed and arranged as to be connected with the auxiliary laterally movable elements for swinging them toward or from each other, as the case may be, as the cultivator travels along a row in straddling relation thereto, the mechanism replacing that ordinarily provided and being capable of installation upon already existing cultivators without necessitating any changes therein.

A further object is the provision of a mechanism of this character which will be very simple and inexpensive to manufacture, easy to install and operate, positive in action, efficient and durable in service, and a general improvement in the art.

To the attainment of the above and other objects and advantages, the invention consists in the details of construction and the arrangement of parts to be hereinafter more fully described and claimed and illustrated in the accompanying drawings, it being, however, understood that the embodiment disclosed is merely a preferred exemplification of the invention, as the right is reserved to make all such changes in the details of construction and arrangement of parts to widen the field of utility of the device, provided, however, such variations constitute no departure from the spirit of the invention or the scope of the claims hereunto appended.

In the drawings:

Figure 3 is a horizontal section taken on line 3—3, Fig. 2, showing the hoeing teeth spread to position for hoeing on each side of a row of plants.

Figure 4 is a similar view showing the hoes drawn toward one another and in position to hoe between the plants of a row as well as on each side thereof.

Figure 5 is a detail view of my hoe controlling attachment.

Throughout the specification and drawings like reference characters designate like parts.

Figure 1:
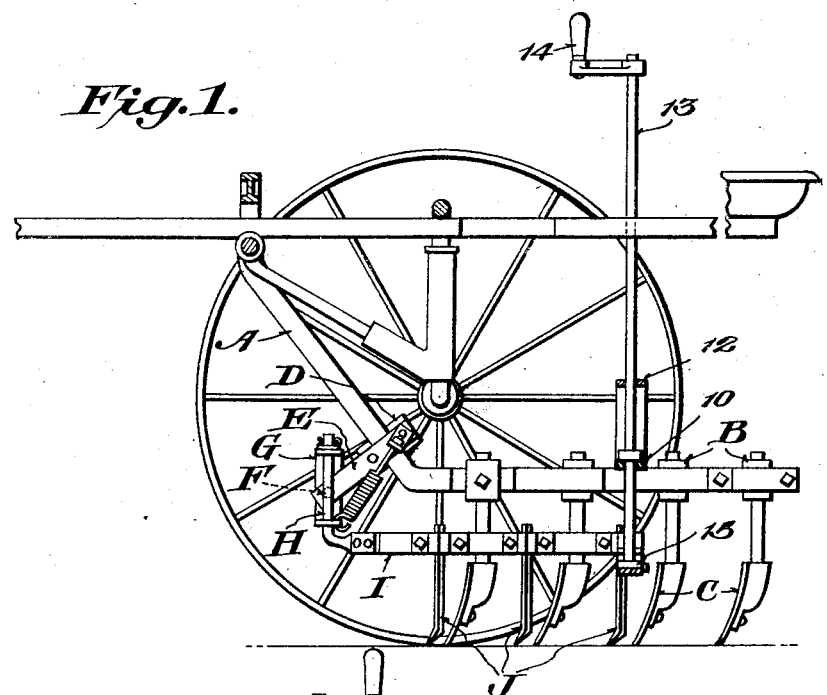
Figure 1 is a longitudinal section through a cultivator equipped with my mechanism.
Figure 2:
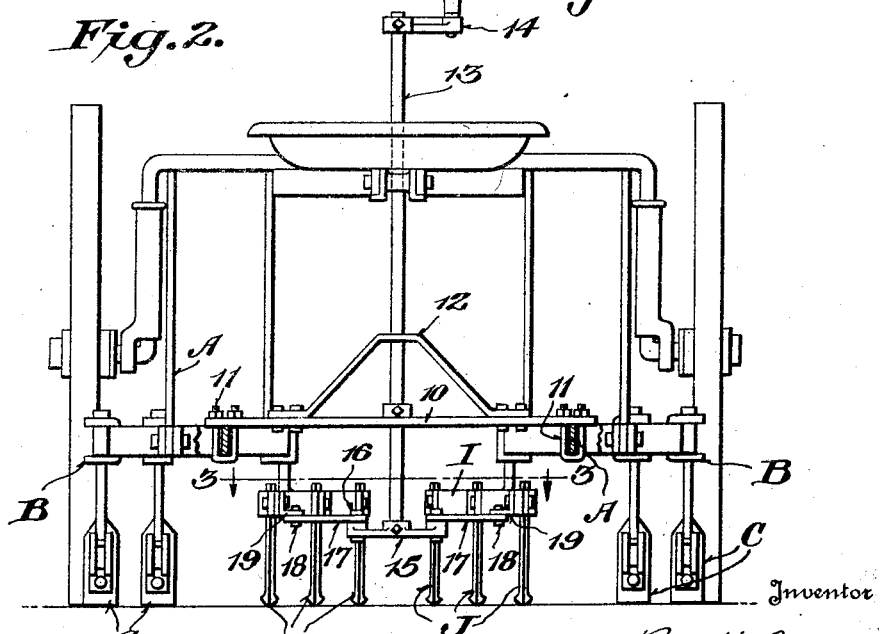
Figure 2 is a rear elevation of a cultivator showing a set of hoeing teeth connected therewith, and my improved mechanism for controlling the operation thereof.

Referring more particularly to the drawings, it will be observed that I have illustrated a cultivator of a well known straddle row type embodying the usual wheel supported frame with which are suitably connected spaced beams designated broadly by the letter A, which beams may consist of any desired number of parts of any preferred shape and equipped with clamping or other means B for holding a plurality, or gang, of shovels C or other ground engaging implements of any well known or preferred type ordinarily used in connection with cultivators. In devices of the particular type in question, it has been a common practice to provide means for cultivating between the plants of the particular row worked upon. Ordinarily, such means consists of an attachment to the ordinary cultivator, which attachment comprises a clamping device D mounted upon the outer portion of each beam A and including a forwardly and downwardly extending bracket arm E upon which is pivoted, at F, a U-shaped bracket G through the upper and lower arms of which is pivoted a trunnion H formed as an upward extension on the forward end of an angular or serpentine bar I. This structure is duplicated at each side of the machine, or in other words one of the bars is carried, by the bracket and clamp devices mentioned and shown, by each of the main beams A of the cultivator. Each bar I is equipped with any desired number of depending teeth or other ground engaging elements J and it will be observed that the angularity of the bars is such that the teeth J of each, or carried by each, are progressively greater distances apart toward the rear of the machine. Up to this point there is no novelty in the disclosure as it has been mentioned already that it is a common practice to make use of such devices which are, however, provided with lever means for controlling the action, the lever means being so arranged as to require the services of an operator other than the driver of the machine. Quite naturally, the ordinary actuating means is not disclosed as it is well known.

In carrying out the present invention I eliminate, entirely, the usual lever devices for moving the bars I and in lieu thereof I make use of an actuating mechanism which includes a main supporting bar 10 adapted to be disposed horizontally and to be located at the intermediate portion of the main beams A, this bar 10 having its end portions equipped with or carrying U-bolts 11 or the like adapted to embracingly engage the innermost portions of the main beams A for clamping the bar 10 firmly in place with respect to the main beam so that it will move therewith whenever they are moved up or down, as the case may be, by the means ordinarily provided for the purpose, it being well known that it is the usual practice to raise the beams when the device is being drawn along idle. Secured to the bar 10 and projecting thereabove is a combined brace, bearing, yoke, or truss 12 riveted, bolted or otherwise held in place.

Journaled through the center of the bar 10 and member 12 is a vertical rod or shaft 13 which extends to a point above the driver's seat and which is equipped at its upper end with a crank handle 14 located in convenient position to be grasped by the operator so that the rod or shaft 13 may be turned from time to time. The shaft or rod projects to a considerable extent below the bar 10 and carries, at its lower extremity, a cross arm or member 15 upon which are pivoted, at 16, links 17 which are in turn pivotally connected at 18 with angle brackets or knee irons 19 bolted, riveted or otherwise suitably secured to the bars I.

In the operation, it will be apparent that by rocking the rod or shaft 13 back and forth the arm 15 will act to pull or push upon the links 17 and as these links are secured to the bars I carrying the depending teeth J it is apparent that these bars will be alternately moved toward each other and moved apart so that the teeth J will pass through the ground laterally of the line of movement of the machine itself. Obviously, it is necessary that the operator turn the crank handle 14 at the proper time intervals to swing the bars I toward each other or apart, as the case may be, in accordance with the positions of the plants in the row, as it is evident that the members I and the teeth carried thereby should be brought together only between the successive plants as otherwise the plants might be torn up or at least damaged. The combination of the lateral movement of the teeth J with their movement through the soil in accordance with the forward movement of the machine will insure a thorough breaking up of the soil between the plants so that weeds and other undesired vegetation will be destroyed in addition to the advantages gained by the cutting, crushing or crumbling of the soil itself.

In actual practice it has been discovered that a machine equipped with my operating means is capable of cultivating a greater number of acres per day with a single operator in charge than can be cultivated by a machine of the old type needing the services of two attendants. Naturally, a certain amount of skill is required to synchronize the rocking of the shaft 13 with respect to the rate of travel of the machine along a row but a comparatively slight amount of practice will result in proficiency in the operation. It is really a point of advantage that all the manipulation is within the control of a single operator not only for the reason that it saves labor but also as the employment of two operators frequently causes difficulties on account of lack of harmony in and unison of movement.

From the foregoing description and a study of the drawings it will be apparent that I have thus provided a very simple device for the purpose specified which will efficiently perform all the functions for which it is intended and one which will, on account of the fewness of parts and ruggedness of construction be unlikely to get out of order so that it should have a long and satisfactory life in addition to its other meritorious features.

I claim:

1. In combination with an ordinary cultivator including main beams carrying ground engaging implements, a rigid supporting structure secured to said beams, auxiliary beams pivoted at their forward ends upon said main beams and located therebetween, ground engaging implements carried by the auxiliary beams, and a rock shaft journaled through said rigid supporting structure and operatively connected with said auxiliary beams to move the latter and bring the implements thereon substantially into engagement for cultivating between the plants in a row.

2. In a cultivator, main beams carrying ground engaging implements, a combined bearing and brace structure detachably mounted upon said beams, auxiliary beams located inwardly of the main beams and pivoted thereto at their forward ends, ground engaging implements carried by the auxiliary beams, and a manually operable rock shaft journaled through said combined bearing and brace structure and operatively connected with said auxiliary beams to move the latter and bring the implements thereon substantially into engagement for cultivating between the plants in a row.

3. An attachment for ordinary cultivators comprising auxiliary beams adapted to be pivotally attached to the beams of a cultivator between the same and carrying ground engaging implements, a bearing structure provided with means adapted to be clamped upon the cultivator beams, a rock shaft journaled through said bearing structure, and links connected with the rock shaft and adapted for connection with said auxiliary beams to move the latter and bring the implements thereon substantially into engagement for cultivating between the plants in a row.

4. An attachment for ordinary cultivators comprising auxiliary beams adapted to be pivotally attached to the beams of a cultivator between the same and carrying ground engaging implements, a bearing structure provided with means adapted to be clamped upon the cultivator beams, a rock shaft journaled through said bearing structure, and links connected with the rock shaft and adapted for connection with said auxiliary beams to move the latter and bring the implements thereon substantially into engagement for cultivating between the plants in a row, said bearing structure serving as a brace for the cultivator beams and including an upstanding arch portion serving to steady the rock shaft.

In testimony whereof I affix my signature.

ROY H. BURKEY.